United States Patent [19]
Pecht et al.

[11] Patent Number: 5,448,836
[45] Date of Patent: Sep. 12, 1995

[54] TAPE CASSETTE SELECTION LENGTH MARKER

[75] Inventors: Adam Pecht, Downey, Calif.; Luis Fernandez, Bountiful, Utah

[73] Assignee: Wea Manufacturing Inc., Olyphant, Pa.

[21] Appl. No.: 166,576

[22] Filed: Dec. 13, 1993

[51] Int. Cl.[6] .......................... B65H 19/28; G01B 7/04
[52] U.S. Cl. ...................................... 33/751; 242/532.1; 242/534.2; 242/344; 33/754
[58] Field of Search ................ 242/532.1, 532.3, 534, 242/534.2, 344, 357; 33/737, 751, 754

[56] References Cited

U.S. PATENT DOCUMENTS

| | | | |
|---|---|---|---|
| 3,290,785 | 12/1966 | Johnson | 33/737 X |
| 3,637,164 | 1/1972 | Trefzger et al. | 242/344 X |
| 3,797,770 | 3/1974 | Hosoda et al. | 242/532.1 X |
| 3,810,246 | 5/1974 | Stone et al. | 242/344 X |
| 3,908,930 | 9/1975 | Gresens | 242/344 X |
| 4,185,793 | 1/1980 | Stuzzi | 242/344 |
| 4,233,749 | 11/1980 | Coulter et al. | 33/737 |
| 5,125,587 | 6/1992 | Perego | 242/532.1 X |

*Primary Examiner*—John M. Jillions
*Attorney, Agent, or Firm*—Shenier & O'Connor

[57] ABSTRACT

Apparatus for placing a mark on the spine of a tape cassette at a location therealong corresponding to the length of the selection on the tape in which cassettes successively loaded with the selection from a pancake tape having the same selection recorded thereon a plurality of times are passed to a marking station at which a marking device is moved from a home position to a second position spaced therefrom by a distance equal to the length of the selection in response to the loading of a selection into an empty cassette. The marking device is actuated in response to movement of a cassette into the marking station with its spine extending in a direction from the home position toward the second position of the marking device. The exhausting of the pancake tape is sensed to return the marking device to its home position.

18 Claims, 3 Drawing Sheets

TAPE CASSETTE SELECTION LENGTH MARKER

FIELD OF THE INVENTION

The invention is in the field of recording tape cassettes and more particularly relates to apparatus for automatically placing a mark on the cassette indicating the length of the selection recorded on the tape contained in the cassette.

BACKGROUND OF THE INVENTION

In the manufacture of cassettes containing tapes having selections recorded thereon, a "pancake" which is a thin roll of a relatively long piece of tape having the same selection recorded thereon a plurality of times, is used to load the selection into a plurality of empty and unlabeled cassettes. After the cassettes have been loaded with selections, they are conveyed to a labeling station at which labels are applied to the cassettes. As is known, these labels carry information concerning the selection in the cassette as well as the artist and the like.

In the cassette duplication process described hereinabove, it is possible that cassettes having different selections recorded thereon have the same label placed on the cassettes at the labeling station. That is to say, a cassette loaded with one selection from one pancake may arrive at the labeling station which receives cassettes loaded with a different selection from a different pancake. The undesirability of a selection carrying the wrong label will readily be apparent.

SUMMARY OF THE INVENTION

One object of our invention is to provide apparatus for automatically marking a cassette to indicate the length of the selection carried by the tape therein.

Another object of our invention is to provide apparatus for minimizing mislabeling of cassettes.

Still another object of our invention is to provide a cassette marking apparatus which can operate at production line speed.

A further object of our invention is to provide a cassette marking apparatus which is simple in construction and in operation.

Other and further objects of our invention will appear from the following description.

BRIEF DESCRIPTION OF THE DRAWINGS

In the accompanying drawings to which reference is made in the instant specification and which are to be read in conjunction therewith and in which like reference characters are used to indicate like parts in the various views.

DESCRIPTION OF THE PREFERRED EMBODIMENT

Figure 5:
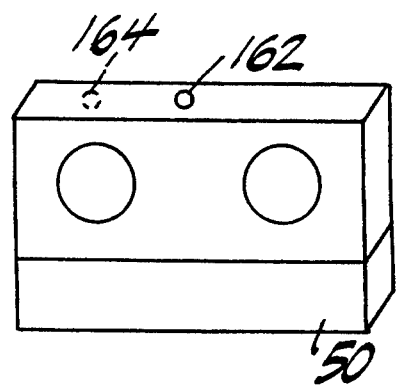
FIG. 5 is a perspective view of a cassette illustrating the principle of operation of our apparatus for marking a cassette to indicate the length of a selection contained on the cassette tape.

As is known in the art of manufacturing cassettes containing tapes having selections recorded thereon, the lengths of the selections vary over a relatively wide range for the various selections loaded into the cassettes. Recognizing that fact, we have provided apparatus to be described hereinbelow for placing a mark on a cassette, the location of which is indicative of the length of the selection which has been loaded into the cassette. For example, referring to FIG. 5, the spine of a cassette 50 may have a mark 162 located therealong which indicates the length of the selection recorded on the tape in that cassette. Another cassette may have loaded therein a selection of a different length resulting in a mark 164 indicated by the broken lines in FIG. 5 at a different location along the spine of the cassette. Thus, when a cassette carrying a mark 164 arrives at the labeling station which is intended to receive only cassettes containing tapes having selection lengths indicated by the mark 162, the former is readily distinguished from the latter and can be removed from production.

Figure 1:
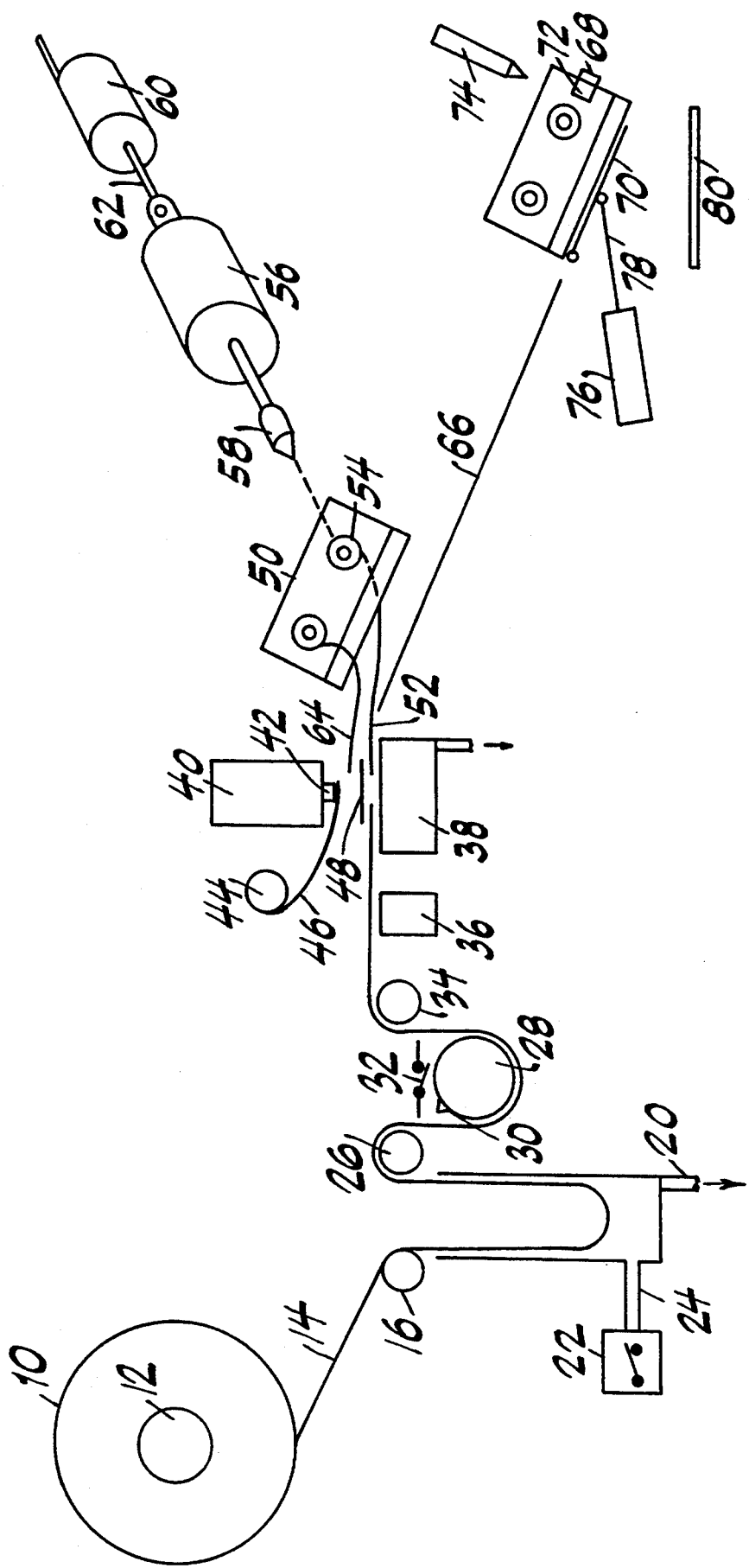
FIG. 1 is a schematic view illustrating a tape cassette loading apparatus provided with our device for marking the cassette to indicate the length of the selection recorded on the tape contained therein.

Referring now to FIG. 1, in the course of loading cassettes with selections, a "pancake" 10 carried by a shaft 12 has recorded thereon the same selection a plurality of times. It is intended that the respective selections from the pancake 10 be successively loaded on a plurality of cassettes 50 until the pancake 10 is exhausted.

In the course of loading selections from the pancake 10 into cassettes 50, the tape 14 from the pancake 10 is passed over a guide roller 16 and into a tensioning vacuum box 18 provided with an exhaust passage 20. A vacuum switch 22 connected to the box 18 by a line 24 senses the presence of a vacuum which indicates that the tape 14 is present in the box 18.

In the practice of our invention, we take the tape 14 emerging from the vacuum tensioning box 18, pass it around a guide roller 26 and thence around a counter wheel 28. Wheel 28 may for example be provided with a projection 30 which closes a switch 32 for each revolution of the wheel 28. It will readily be appreciated that any other means, such as a photoelectric switch, could be substituted for the switch 32.

After leaving the wheel 28, the tape 14 passes around a guide 34 and over an end-of-selection sensor 36 to a vacuum table 38. As is known in the art, the vacuum applied to table 38 holds the leading end of the tape 14 in position for the splicing operation to be described.

Also as is known in the art, a splicer 40 positioned over the table 38 includes an armature 42 adapted to be driven downwardly toward the table 38 upon actuation of the splicer. A roll 44 positioned adjacent to the splicer 40 carries splicing tape 46 from which a short length 48 is cut and positioned over the table prior to the splicing operation.

Prior to the splicing operation, an empty cassette 50 is positioned adjacent to the table 38. The tape in the cassette is cut and the leading end 52 thereof is positioned over the table 38 beneath the length 48. When the splicer 40 is actuated, length 48 is moved downwardly so as to splice the leading end of the tape 14 to tape 52 which is connected to a takeup core 54 of the cassette 50.

The tape loading apparatus includes a takeup motor 56 having a driving element 58. The rod 62 of the piston and cylinder assembly 60 is connected to the motor 56. Upon the application of fluid under pressure to the cylinder 60, the rod 62 moves the motor 56 from a position at which the driving element 58 is remote from core 54 to a position at which the driving element is in driving engagement with the core 54.

Upon completion of the loading of a selection into the cassette 50, as indicated by the end-of-selection sensor 36, the tape 14 is again cut and the trailing end of the cut tape is spliced to the cassette tape end 64 connected to the other core of the cassette 50. When this has been accomplished, cylinder 60 is actuated to cause motor 56 to be withdrawn from the driving position.

Since all of the operations just described and the control thereof, except for the passage of the tape 14 around the wheel 28, are well known in the art, they will not be described in further detail.

When the driving element 58 is withdrawn from the core 54, the cassette 50 is released and it slides down a guide 66 toward a stop 68 which positions the cassette over a trap door 70. A sensor 72 senses the presence of a cassette against the stop 68 and in operative relationship with the marker 74.

When the marking operation is completed in a manner to be described, a cylinder 76 is actuated to cause its rod 78 to move trap door 70 to release the cassette 50 to permit it to fall on an accumulating conveyor 80 which carries it to the labeling station.

Figure 2:
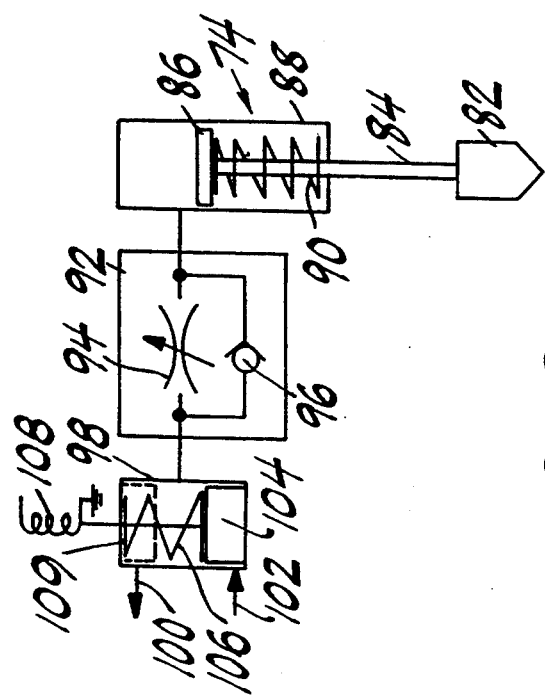
FIG. 2 is a schematic view of the valve arrangement for actuating the marker of our cassette marking apparatus.

Referring now to FIG. 2, the marker 74 includes a marker tip 82 carried by the rod 84 of a piston 86 disposed in a cylinder 88. A spring 90 within the cylinder 88 returns the piston and the tip 82 to its inoperative position.

The actuating system for the marker 74 includes a flow control valve assembly 92 including a settable inlet restriction 94 bypassed by a return check valve 96. An on/off valve housing 98 connected at one end to an exhaust port 100 and at the other end to a pressure source 102 houses a valve 104 carried by the armature 106 of a solenoid 108. A spring 109 normally positions the piston 104 at a location within the cylinder 98 at which it blocks the inlet 102 and connects the valve assembly 92 to the exhaust port 100.

When the marker 74 is to be actuated, a signal is applied to the winding 108 in a manner to be described hereinbelow. In response thereto, piston 104 is moved to the broken line position shown in FIG. 2 in which the inlet bore 102 of the on/off valve is connected to the assembly 92. In response thereto, fluid under pressure flows through the restriction 94 and to the interior of cylinder 88 to move piston 86 and marker tip 82 downwardly. It will readily be appreciated that the settable restriction 94 is so set as to control the descent of the marker tip 82 at the desired rate. While we may employ any suitable marking device, preferably we use one having a heated marking tip 82. While it is desirable to cause the marker tip 82 to move downwardly relatively slowly to prevent the heating element in the tip 82 from breaking as a result of the impact of the tip 82 on the shell of the cassette 50, it is desirable to return the tip quickly to prevent jamups and permit the cassette loading apparatus to operate at a relatively high rate. Thus, when the piston 104 returns to the full line position shown in FIG. 2, check valve 96 bypasses the restriction 94 to permit fluid from the cylinder 88 to be exhausted rapidly as spring 90 returns piston 86 to its retracted position.

Figure 4:
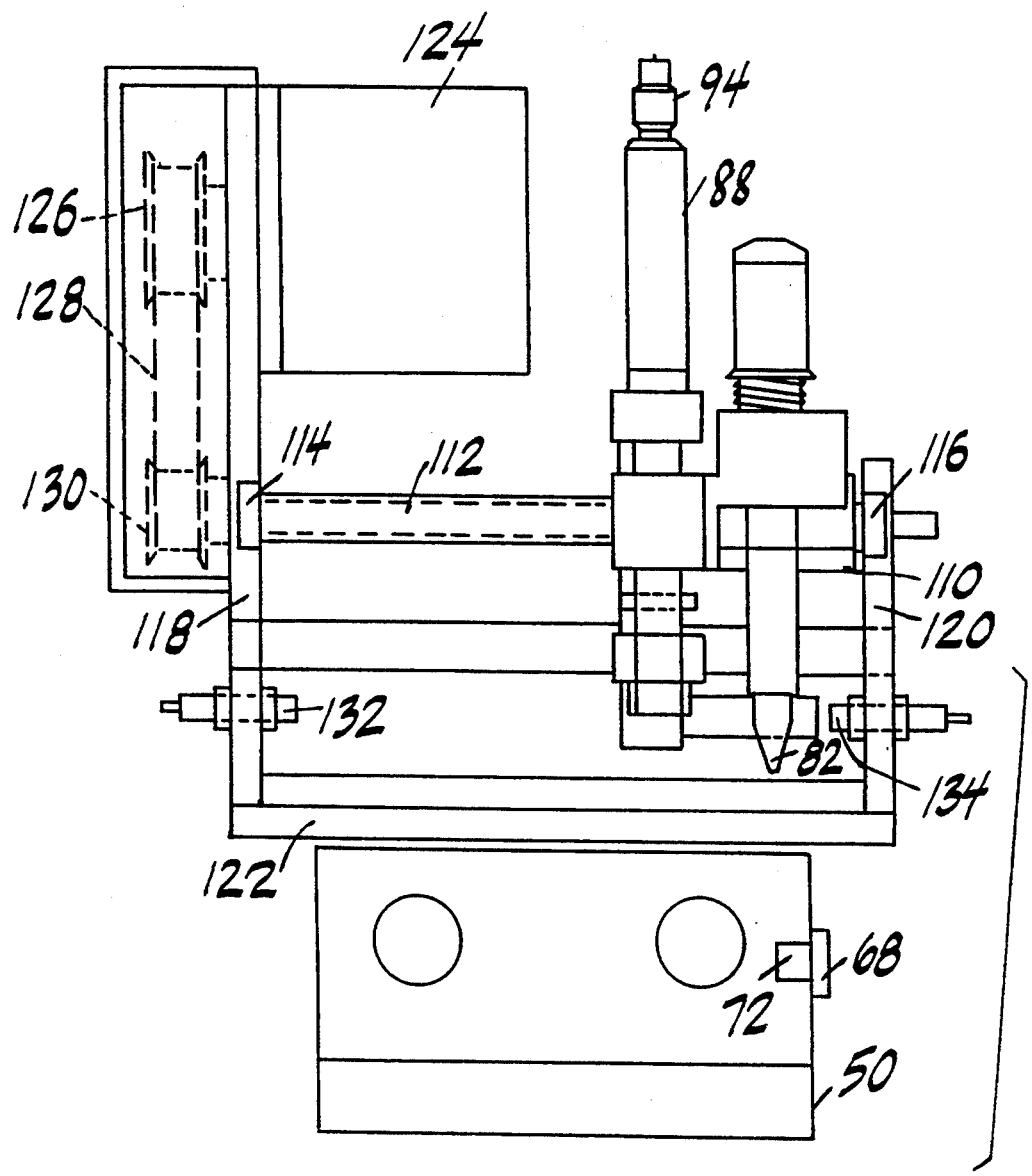
FIG. 4 is an elevation illustrating one form of marking device of our cassette marker apparatus.

Referring now to FIG. 4, we have illustrated one specific embodiment of our marking device in which the marker having a tip 82, the cylinder 88 and the valve assembly including the adjustable restriction 94, are supported on a ball bearing nut 110. The tip 82 under the control of the cylinder 88 is supported for vertical reciprocating movement between a retracted position shown in full lines in FIG. 4 and an actuated position at which the tip 82 engages the spine of the cassette 50 to place a mark thereon. A screw 112 which receives the ball nut 110 is supported for rotary movement in a pair of bearings 114 and 116 carried by arms 118 and 120 extending upwardly from a base 122. It will readily be appreciated that when the screw 112 rotates, nut 110 and the marker tip and associated structure move in the direction of the axis of the screw.

Our system includes a stepper motor 124, the shaft of which carries a pulley 126 connected by a belt 128 to a pulley 130 on the shaft which drives the screw 112. When the motor 124 is energized to drive in the forward direction, the screw 112 rotates to move the marker tip 82 out of its home position in a direction parallel to the spine of a cassette 50 which subsequently moves into the marking station. We provide respective proximity devices 132 and 134 for sensing the ends of the limit of travel of the marker tip 82.

As will be described more fully hereinbelow, four conditions must be fulfilled before pulses will be passed from the switch 32 associated with counter wheel 28 to the control circuitry associated with stepper motor 124. The first of these conditions is that tape 14 be present in the vacuum box 18, as indicated by closure of switch 22. The second condition is that the marker tip 82 be in its home position, as indicated by the closure of the proximity switch 134. The third condition is that the takeup motor 56 be in its forward or drive position, as for example might be indicated by a limit switch 138. The last condition is that the solenoid 40 has been actuated, as might be indicated by closing of a switch 140, for example.

Figure 3:
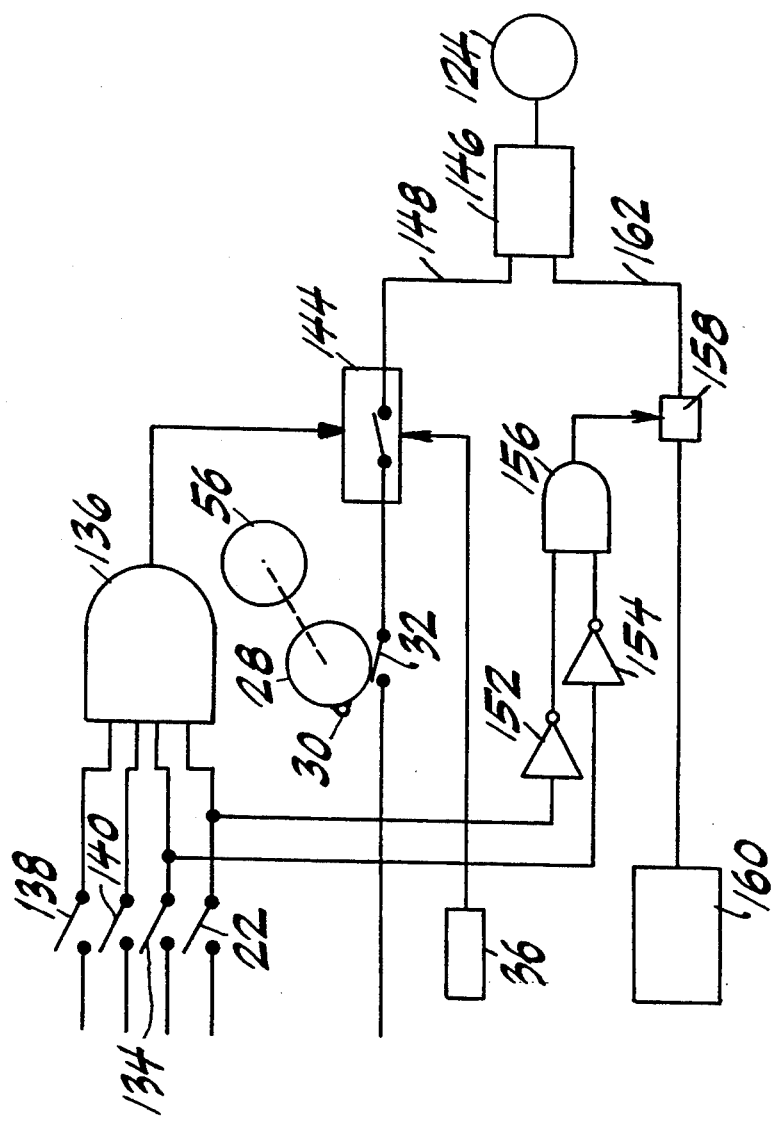
FIG. 3 is a schematic view of a portion of one form of control circuitry which may be employed with our cassette marker.

Referring to FIG. 3, we have shown one form of a portion of the circuit which might be used to control the cassette loading and marking operations. The switches 22, 134, 138 and 140, are connected to the input terminals of a 4-input AND circuit 134 to produce an output pulse when all four of the conditions described hereinabove exist. This output pulse closes a switch 144 of any suitable type known to the art to connect the counter wheel switch 32 to the forward direction input 148 of the stepper motor control circuit 146.

When the end of a selection on the tape 14 has been reached, circuit 36 produces an output pulse which is used to open the switch 144 to prevent any further counter pulses from reaching the control circuit 146.

When the tape 14 of the pancake 12 is exhausted so that no more tape is present in the vacuum housing 18, switch 22 opens. Since the marker tip 82 is no longer in its home position, switch 134 also is open. Under these conditions, a pair of inverters 152 and 154 provide signals to a 2-input AND circuit 156 to open a gate 158 to apply pulses from an electronic pulse generator 160 to the reverse input control 162 of the circuit 146. Under these conditions, stepper motor 124 is actuated to return the marker tip 82 to its home position, as indicated by the proximity device 134.

In operation of my system for marking cassettes to indicate the length of the selection recorded therein, the tape 14 from the pancake 10 first is threaded through the tape tensioning vacuum box 18 to cause the vacuum switch 22 to close. The tape is then passed around the wheel 28, over the guide roller 36 and the end-of-selection detector to the vacuum table 38 over which the leading end is held preparatory to splicing. An empty cassette 50 is fed from a supply to the loading position illustrated in FIG. 1 in a suitable manner known to the art. Next, the splicer 40 is actuated to apply a length 48 of splicing tape to connect the lead end of the tape 14 to the cassette lead tape 52 carried by the reel 54 on which the selection is to be wound. This results in closure of the switch 138. Next, the takeup motor 56 is moved from its retracted position to a position at which its winding element 58 engages the hub of the spool 54. A suitable switch, such as switch 140, closes to indicate that the takeup motor is in operative position. It will be remembered that prior to operation of the system, the marker 82 is in its home position so that switch 134 is closed. Under these conditions, circuit 136 applies a pulse to switch 144 to close the same.

The takeup motor 56 is energized to cause the tape 14 to be wound onto the hub 54. In the course of this operation, switch 144 passes pulses from the switch 32 to the forward drive input 148 of the stepper motor control circuit 146. In response to these pulses, stepper motor 124 causes the marker tip 82 to move to the left, as viewed in FIG. 4.

At the end of a selection, as sensed by the sensor 36, a pulse is produced to actuate the splicer 40 again to cut the tape 14 and to apply a length 48 of splicing tape between the cut end moving toward core 54 and the portion 64 of the cassette tape on the other hub or core.

Actuation of the end-of-selection sensor 36 also opens switch 144 and causes the takeup motor 56 to be withdrawn. Opening of switch 144 prevents further pulses of counter wheel switch 32 from reaching the stepper motor control circuit. It will be appreciated that by this time the tip 82 has moved along from its home position to a position which is a measure of the length of the selection which has been recorded on the tape in the cassette.

When the takeup motor 56 is withdrawn, the loaded cassette is released to slide along guide 66 to stop 68 which arrests the cassette over the trap door 70. The presence of a loaded cassette in engagement with stop 68 actuates detector 72. Detector 72 generates an appropriate signal to energize solenoid 108 to feed fluid under pressure to cylinder 88 through the restriction 94. The setting of restriction 94 is such that the tip 82 moves downwardly at a rate sufficiently slow as to prevent damage to the heating element in the tip. After the tip 82 has engaged the cassette 50 to place a mark thereon, solenoid 108 is de-energized to connect cylinder 88 to the exhaust through the check valve 96. Tip 82 is then rapidly retracted by spring 90.

When the marking operation is complete, fluid is fed to cylinder 76 to open door 70 to permit the loaded and marked cassette to fall to the accumulator conveyor 80 which carries the cassette to the labeling station.

After the first cassette has been loaded and marked in the manner just described, a fresh empty cassette is moved from the supply into the loading position, the splicer 40 is actuated, the takeup motor 56 is moved into operative position and the loading operation takes place as with the first cassette. During the loading of the second and succeeding cassettes, no counter pulses are passed to the stepper motor control circuit 146 since the marker tip 82 has already been moved to a position corresponding to the length of the selection recorded on the tape 14 of pancake 10.

When all of the selections on tape 14 have been loaded into cassettes so that the pancake 10 is exhausted, switch 22 opens. Since, at this time, the marker tip 82 is out of its home position, switch 134 also is open. Under these conditions, circuit 156 opens gate 158 to apply pulses from electronic pulse generator 160 to the reverse input 162 of stepper motor 124 to return the marker tip 82 to its home position. The resultant closing of switch 134 prevents further pulses of generator 160 from reaching circuit 146.

When the tape from a fresh pancake is threaded through vacuum box 18, switch 22 closes and the system is ready to load and mark cassettes.

It will be seen that we have accomplished the objects of our invention. We have provided apparatus for automatically marking a cassette to indicate the length of the selection which has been loaded into the cassette. Our apparatus minimizes the possibility of mislabeling of cassettes. It operates at production line speed. It is simple in construction and in operation.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for marking a cassette at a marking station with a mark at a location thereon corresponding to the length of the selection recorded on the cassette tape including in combination,
   a marking device,
   means mounting said marking device at said marking station for movement from a home position to a second position spaced from said home position by a distance corresponding to the length of the selection recorded on the cassette tape,
   means for moving said marking device from said home position to said second position,
   means for positioning a cassette at said marking station,
   and means for actuating said marking device while in said second position to mark said cassette at said marking station.

2. Apparatus as in claim 1 including means for loading a cassette with said selection, said marking device moving means being responsive to said loading means.

3. Apparatus as in claim 1 in which said means for actuating said marking device is responsive to movement of a cassette into said marking station.

4. Apparatus as in claim 1 in which said mounting means mounts said marking device for rectilinear movement from said home position to said second position, said mounting means including means mounting said marking device for movement between a retracted position and a marking position.

5. Apparatus as in claim 1 in which said mounting means comprises means mounting said marking device for movement between a retracted position and an actuated position and means for biasing said device to said retracted position, said actuating means comprising means for moving said device relatively slowly from said retracted position to said actuated position while permitting rapid return of said device from said actuated position to said retracted position under the action of said biasing means.

6. Apparatus as in claim 5 in which said means mounting said device for movement between said retracted and actuated position comprises a piston and cylinder, and in which said actuating means comprises a source of fluid under pressure, an exhaust port, a flow restrictor for connecting said source to said cylinder to move said device relatively slowly from said retracted position to said actuated position and a check valve bypassing said flow restrictor to connect said cylinder to said exhaust port to permit said rapid return.

7. Apparatus as in claim 1 in which said cassette has a spine, said positioning means comprising means for positioning a cassette at said marking station with its spine facing said marking device and extending in a direction from said home position to said second position of said marking device whereby the position of said mark along said spine corresponds to the length of the selection on the cassette tape.

8. Apparatus for marking a cassette at a marking station with a mark at a location thereon corresponding to the length of the selection recorded on the cassette tape including in combination
- a pancake of tape having said selection recorded thereon a plurality of times,
- means at a loading station for loading successive empty cassettes with the selection recorded on said pancake tape,
- a marking device,
- means mounting said marking device at said marking station for movement from a home position to a second position spaced from said home position by a distance corresponding to the length of said selection,
- means responsive to movement of said pancake tape in the course of a loading operation for moving said marking device from said home position toward said second position,
- means for sensing the end of a selection on said pancake tape,
- means responsive to said end-of-selection sensing means for disabling said marking device moving means,
- means for moving a loaded cassette into said marking station and
- means responsive to the presence of a loaded cassette in said marking station for actuating said marking device in the second position thereof.

9. Apparatus as in claim 8 including means for sensing the exhausting of said pancake tape and means responsive thereto for returning said marking device to said home position.

10. Apparatus for marking a cassette at a marking station with a mark at a location corresponding to the length of the selection recorded on the tape in the cassette including in combination
- a pancake of tape having the selection recorded thereon a plurality of times,
- means at a loading station for loading successive empty cassettes with the selection recorded on said pancake tape,
- said loading means comprising a driven takeup element and means mounting said takeup element for movement from an inactive position to an active position in engagement with a takeup core of a cassette at said loading station,
- splicing means adapted to be actuated to splice said pancake tape to a leader tape of a cassette at said loading station,
- a marking device,
- means mounting said marking device at said marking station for movement from a home position to a second position spaced from said home position by a distance corresponding to the length of said selection,
- drive means for said marking device,
- means responsive to movement of said pancake tape into said loading station for producing a forward drive signal,
- on/off coupling means for passing said forward drive signal to said marking device drive means,
- means responsive to the concomitant presence of pancake tape extending to said loading station and actuation of said splicing means and presence of said takeup element in its active position and presence of said marking element in its home position for turning said coupling means on,
- an end-of-selection detector between said pancake and said loading station,
- means responsive to actuation of said end-of-selection detector for turning said coupling means off,
- means for guiding a loaded cassette to said marking station, and
- means responsive to the presence of a loaded cassette in said marking station for actuating said marking device.

11. Apparatus as in claim 10 including an accumulator conveyor, means for releasably holding a cassette in said marking station and means for actuating said releasable means to deliver said cassette to said accumulator conveyor.

12. Apparatus as in claim 10 including means responsive to the concomitant absence of pancake tape extending to said loading station and absence of said marking device from its home position for returning said marking device to its home position.

13. Apparatus as in claim 12 in which said means for returning said marking device to its home position comprises means for generating a return signal, a normally closed gate between said generator and said marking device drive means, and means responsive to the concomitant absence of pancake tape extending to said loading station and absence of said marking device from its home position for opening said gate.

14. Apparatus as in claim 10 in which said cassette has a spine, said loaded cassette guiding means comprising means for positioning a cassette at said loading station with its spine facing said marking device and extending in a direction from said home position to said second position of said marking device whereby the position of said mark along said spine corresponds to the length of the selection on the cassette tape.

15. Apparatus as in claim 10 in which said marking device mounting means comprises means mounting said marking device for movement between a retracted position and an actuated position and means for biasing said device to said retracted position, said actuating means comprising means for moving said device relatively slowly from said retracted position to said actuated position while permitting rapid return of said device from said actuated position to said retracted position under the action of said biasing means.

16. Apparatus as in claim 15 in which said means mounting said device for movement between said retracted and actuated positions comprises a piston and cylinder, and in which said actuating means comprises a source of fluid under pressure, an exhaust port, a flow restrictor for connecting said source to said cylinder to move said device relatively slowly from said retracted position to said actuated position and a check valve bypassing said flow restrictor to connect said cylinder to said exhaust port to permit said rapid return.

17. Apparatus as in claim 10 including a tape tensioning vacuum box between said pancake and said loading station and a vacuum switch responsive to the presence of tape in said box.

18. Apparatus as in claim 10 in which said forward drive signal producing means is a pulse generating wheel driven by said pancake tape.

* * * * *